United States Patent [19]
Friz et al.

[11] Patent Number: 5,786,994
[45] Date of Patent: Jul. 28, 1998

[54] PERFORMANCE MONITORING SYSTEM AND METHOD FOR A LASER MEDICAL IMAGER

[75] Inventors: Robert N. Friz, Cottage Grove, Wash.; Mark D. Hunter, Woodbury, Minn.; Douglas J. Rowen; Steven J. Craig, both of St. Paul, Minn.; Todd G. Langmade, Mahtomedi, Minn.; Charles N. McMacken, Apple Valley, Minn.

[73] Assignee: Imation Corp., Oakdale, Minn.

[21] Appl. No.: 344,146

[22] Filed: Nov. 23, 1994

[51] Int. Cl.$^6$ .................................................. G05B 9/02
[52] U.S. Cl. .................. 364/184; 364/188; 364/551.01; 345/439; 382/131
[58] Field of Search ................................ 364/130, 184, 364/474.15, 474.16; 382/128, 129, 130, 131, 132, 133, 134; 340/825.16, 825.06–825.08; 378/99, 98.7, 901; 395/164, 118; 350/3.66; 354/298; 358/298; 235/375; 370/94.1; 219/121.83; 345/439

[56] References Cited

U.S. PATENT DOCUMENTS

| | | | |
|---|---|---|---|
| 4,213,462 | 7/1980 | Sato | 128/634 |
| 4,315,318 | 2/1982 | Kato et al. | 382/264 |
| 4,583,834 | 4/1986 | Seko et al. | 355/14 C |
| 4,958,283 | 9/1990 | Tawara et al. | 364/413.13 |
| 4,965,672 | 10/1990 | Duke et al. | 358/298 |
| 4,993,025 | 2/1991 | Vesel et al. | 370/94.1 |
| 5,049,747 | 9/1991 | Hishinuma | 250/327.2 |
| 5,099,848 | 3/1992 | Parker et al. | 128/661.07 |
| 5,111,044 | 5/1992 | Agano | 250/327.2 |
| 5,117,119 | 5/1992 | Schubert et al. | 250/559 |
| 5,124,789 | 6/1992 | Hiyama et al. | 358/98 |
| 5,140,518 | 8/1992 | Ema | 364/413.01 |
| 5,172,419 | 12/1992 | Manian | 382/6 |
| 5,194,966 | 3/1993 | Quardt et al. | 358/406 |
| 5,229,585 | 7/1993 | Lemberger et al. | 235/375 |
| 5,272,625 | 12/1993 | Nishihara et al. | 364/413.13 |
| 5,282,127 | 1/1994 | Mii | 364/130 |
| 5,303,005 | 4/1994 | Takano et al. | 355/202 |
| 5,305,055 | 4/1994 | Ebner et al. | 355/200 |
| 5,305,199 | 4/1994 | LoBiondo et al. | 364/403 |
| 5,319,543 | 6/1994 | Wilhelm | 364/401 |
| 5,321,520 | 6/1994 | Inga et al. | 358/403 |
| 5,343,276 | 8/1994 | Yamashita et al. | 355/202 |
| 5,347,346 | 9/1994 | Shimizu et al. | 355/202 |
| 5,528,492 | 6/1996 | Fukushima | 364/419.19 |
| 5,581,460 | 12/1996 | Kotake et al. | 395/203 |
| 5,598,185 | 1/1997 | Holmgren | 345/153 |

FOREIGN PATENT DOCUMENTS

| | | | |
|---|---|---|---|
| 0 342 910 A2 | 11/1989 | European Pat. Off. | G03G 15/00 |
| 0 599 261 A1 | 11/1993 | European Pat. Off. | H04N 1/40 |
| WO 92/03789 | 3/1992 | WIPO | G06F 11/32 |

Primary Examiner—Reba I. Elmore
Assistant Examiner—Ramesh Patel
Attorney, Agent, or Firm—William K. Weimer

[57] ABSTRACT

A performance monitoring system and method are realized and implemented, respectively, by a software system. The software system can be configured to automatically monitor one or more remotely located laser imagers over a period of time to generate image quality control reports, eliminating the need for manual generation of such reports by a technician. The software system also can be configured to monitor modality usage, imaging media usage, and the occurrence of errors for each laser imager, and to automatically generate usage reports and error reports. In addition, the software system can be configured to automatically send the reports to users of the laser imagers, automatically initiate an order to send additional imaging media, and automatically initiate a request for dispatch of a service technician in response to an error condition. As a further advantage, the software system can be configured to generate the image quality control reports in conformance with standards of regulatory agencies or other organizations regulating usage of laser imagers.

74 Claims, 11 Drawing Sheets

IMAGE QUALITY CONTROL REPORT

REPORT DATE: 18-OCT-94
HOSPITAL NAME
STREET ADDRESS
CITY, STATE, ZIP CODE

MODEL:      SERIAL NUMBER:

| DATE | DMIN | DMAX | SPEED INDEX | CONTRAST INDEX | DEVELOPER TEMP.(C) | MEDIA TYPE |
|---|---|---|---|---|---|---|
| 01-OCT-94 | 0.205 | 3.263 | 0.829 | 1.286 | 48.4 | |
| 02-OCT-94 | 0.208 | 3.270 | 0.834 | 1.292 | 48.4 | |
| 03-OCT-94 | 0.215 | 3.270 | 0.847 | 1.461 | 48.4 | |
| 04-OCT-94 | 0.215 | 3.270 | 0.847 | 1.461 | 48.4 | |
| 05-OCT-94 | 0.205 | 3.263 | 0.829 | 1.286 | 48.4 | |
| 06-OCT-94 | 0.205 | 3.263 | 0.829 | 1.286 | 48.4 | |
| 07-OCT-94 | 0.205 | 3.263 | 0.829 | 1.286 | 48.4 | |
| 08-OCT-94 | 0.205 | 3.263 | 0.829 | 1.286 | 48.4 | |
| 09-OCT-94 | 0.205 | 3.263 | 0.829 | 1.286 | 48.4 | |

FIG. 4

IMAGE QUALITY CONTROL REPORT

REPORT DATE: 18-NOV-94
HOSPITAL NAME
STREET ADDRESS
CITY, STATE, ZIP CODE

MODEL:            SERIAL NUMBER:

| DATE | MID-TONE DENSITY | AIQC SPEED | DEVELOPER TEMP.(F) | MEDIA TYPE | AIQC MODE |
|---|---|---|---|---|---|
| 11-01-94 | 1.05 | 1.855 | 95.5 | 841432-003 | ACTIVE |
| 11-02-94 | 1.04 | 1.825 | 95.2 | 841432-003 | ACTIVE |
| 11-03-94 | 1.02 | 1.86 | 95.1 | 841432-003 | ACTIVE |
| 11-04-94 | 1.03 | 1.72 | 94.8 | 841432-003 | ACTIVE |
| 11-07-94 | .98 | 1.92 | 94.5 | 841432-003 | ACTIVE |
| 11-08-94 | 1.03 | 1.93 | 94.6 | 841444-008 | ACTIVE |
| 11-09-94 | 1.03 | 1.82 | 95.1 | 841444-008 | ACTIVE |
| 11-10-94 | 1.04 | 1.77 | 95.1 | 841444-008 | ACTIVE |
| 11-11-94 | 1 | 1.6 | 95.2 | 841444-008 | ACTIVE |
| 11-14-94 | .98 | 1.8 | 95 | 841444-008 | ACTIVE |
| 11-15-94 | .95 | 1.85 | 94.9 | 841444-008 | ACTIVE |
| 11-16-94 | 1 | 1.9 | 95 | 841444-008 | ACTIVE |
| 11-17-94 | .98 | 1.58 | 95.3 | 841444-008 | ACTIVE |
| 11-18-94 | 1 | 1.75 | 95.1 | 841444-008 | ACTIVE |

FIG. 5

MODALITY/MEDIA USAGE REPORT

REPORT DATE: 18-OCT-94
HOSPITAL NAME
STREET ADDRESS
CITY, STATE, ZIP CODE

MODEL:          SERIAL NUMBER:

| MODALITY NAME | MEDIA USAGE |
|---|---|
| GE CT HISPEED ADVANTAGE | 210 |
| GE CT IND. CONSOLE | 25 |
| PICKER CT PQ 2000 | 4 |
| PICKER VISTAR WORKSTATION | 15 |
| PHILIPS MR-GYROSCAN | 75 |
| TOTAL: | 329 |

FIG. 8

ERROR REPORT

REPORT DATE: 18-OCT-94
HOSPITAL NAME
STREET ADDRESS
CITY, STATE, ZIP CODE

MODEL:          SERIAL NUMBER:

| MEDIA TYPE | ERROR DESCRIPTOR | COUNTS | FIRST OCCURRENCE | LAST OCCURRENCE |
|---|---|---|---|---|
| | | 1 | 8:30:16 PM 07-MAR-94 | 8:30:16 PM 07-MAR-94 |
| | FLMASL | 1 | | |
| | | 4 | 10:13:15 PM 04-MAR-94 | 10:13:25 PM 31-MAY-94 |
| | EOFTMO | 2 | | |
| | FLMASL | 2 | | |
| | | 1 | 4:02:01 PM 17-FEB-94 | 4:02:01 PM 17-FEB-94 |
| | RWDUNITTRIG | 1 | | |

FIG. 9

PERFORMANCE MONITORING SYSTEM AND METHOD FOR A LASER MEDICAL IMAGER

FIELD OF THE INVENTION

The present invention relates to imaging systems, and, more particularly, to systems for monitoring performance conditions in a laser imager.

DISCUSSION OF RELATED ART

A medical imaging system typically includes at least one input imaging device that generates image data representative of an image, and an output imaging device that forms a visible representation of the image based on the image data. In a medical imaging system, the input imaging device may include a diagnostic modality, such as a magnetic resonance (MR), computed tomography (CT), conventional radiography (X-ray), or ultrasound imaging device. The output imaging device typically includes a continuous tone laser imager that uses the image data to control a scanning laser. The scanning laser exposes imaging media, such as a photosensitive film, to form the visible representation of the image.

The image data generated by the modality contains digital image values. Each of the digital image values corresponds to one of a plurality of pixels in the original image, and represents an optical density associated with the respective pixel. The laser imager processes the digital image values to generate laser drive values. Each of the laser drive values represents an exposure level necessary to accurately reproduce, on imaging media, the optical density of a pixel in the original image. The laser drive values modulate the intensity of the scanning laser to expose the imaging media with a particular exposure level, thereby forming the visible representation of the original image.

The laser imager generates the laser drive values by applying a transfer function to the digital image values. The transfer function essentially represents the relationship between the digital image values and the optical density associated with corresponding pixels in the visible representation of the image on the imaging media. The system user selects one of a plurality of different transfer functions provided by the laser imager. Each of the transfer functions is designed to achieve a desired appearance characteristic, typically involving different contrast or density levels, within the visible representation of the image on the imaging media.

The system user selects a particular appearance characteristic as a means to reveal important diagnostic information within the image. The transfer function generates the laser drive values, and hence the exposure levels, necessary to produce the appearance characteristic. Unfortunately, it is possible that the laser imager may fail to produce the desired appearance characteristic due to a number of system variations. Such variations may include, for example, variations in the sensitometric response of the imaging media, variations in the response of the scanning laser to the laser drive values over time and usage, variations in film processing conditions such as temperature and humidity, and, in wet chemistry-based imagers, variations in development chemistry.

If the laser imager fails to produce the appearance characteristic desired by a system user, the diagnostic value of the image can be impaired. In some cases, inadequacy of the image produced by the laser imager may necessitate a "re-shoot" of the patient by the input imaging device. Many government regulatory agencies require careful monitoring of laser imager quality as a means to avoid the necessity of a "re-shoot." For radiographic imaging, in particular, such agencies seek to avoid exposure of patients to unnecessary doses of X-ray radiation. The agencies therefore require a hospital to submit periodic image quality control reports tracking the operation of the laser imager for all types of imaging. The image quality control reports include key densitometry readings associated with images produced by the laser imager. The densitometry readings provide a guide for identifying variations that can adversely affect image quality.

The generation of image quality control reports is an important tool in ensuring image quality, but continues to be an arduous manual task carried out on a daily basis by a technician. At the start of each day, the technician runs several test images on the laser imager. Each test image typically is a twenty-one step sensitometric pattern containing optical density gradations extending from approximately 0.0 to 3.0 in steps of 0.15. Once the laser imager has formed the test image on the imaging media, the technician manually measures the optical densities of the pattern with a densitometer. The technician uses the optical density measurements to manually generate an image quality control report for the day. The image quality report typically includes a measurement of minimum optical density, a contrast index, and a speed index.

The minimum optical density corresponds to an area of the media that was not exposed by the laser imager. The minimum optical density is referred to as "base+fog," which represents the base support density plus any emulsion density developed in the area in which negligible exposure should occur. The contrast index represents the slope of a substantially linear portion of the density versus log exposure curve for the media, and indicates the light receptivity of the media. The speed index represents the development response of the media to exposure levels. Specifically, speed index represents the log exposure necessary to produce a predetermined density on the media. The predetermined density on which the speed index is based may vary according to the standards of an applicable regulatory organization or media manufacturer. The technician compiles the above measurements in an image quality control reports, and stores the reports on-site. Periodically, the hospital submits a collection of the daily image quality reports to the applicable regulatory agency to satisfy regulatory requirements.

Another manual task required by existing medical imaging systems involves billing for use of laser imager services. In many medical imaging systems, the laser imager receives image data from a plurality of diagnostic imaging modalities. The modalities often are associated with specific departments within a hospital that send image data to one or more central laser imagers. The hospital may charge for use of both the laser imager and imaging media on a departmental basis, allocating a charge to each imaging modality based on individual usage. However, existing imaging systems require accounting of such usage charges by staff persons.

In existing medical imaging systems, a staff person also is required to monitor the supply of imaging media to ensure availability for laser imager services, and periodically prepare order forms requesting delivery of additional imaging media. To accurately gauge demand, the staff person should be familiar with average usage, and should monitor current usage to avoid any possibility of an imaging media shortage. In an extreme case, a staff person may fail to adequately monitor the supply, or underestimate usage, causing some system users to wait for imaging results due to a low supply of imaging media.

The manual generation of image quality control reports requires considerable skill and effort by hospital staff. In addition, accounting of modality usage and monitoring of the supply of imaging media present inefficient uses of staff time. At a time when hospital staff resources are limited due to budget constraints, a reduction in the staff effort required for generation of image quality control reports, accounting of modality usage, and monitoring of imaging media supply would be highly desirable, enabling redirection of the technician's efforts to other important tasks. Accordingly, there is a need for an improved medical imaging system that eliminates or reduces the above burdens placed on medical imaging staff.

SUMMARY OF THE INVENTION

In view of the responsibilities placed on staff by existing medical imaging systems, the present invention is directed to a performance monitoring system and method for a laser imager. The system and method, in accordance with the present invention, can alleviate one or more of such responsibilities, enabling staff to redirect their efforts to other important tasks.

The performance monitoring system and method preferably are realized and implemented, respectively, by a software system. The software system can be implemented on-site with a laser imager, but preferably is configured to automatically monitor the performance of one or more remotely located laser imagers. The software system can be configured to periodically poll the remotely located laser imagers over a period of time to generate image quality control reports, eliminating the need for manual generation of such reports by a technician.

The software system also can be configured to monitor modality usage, imaging media usage, and the occurrence of errors for each laser imager, and to automatically generate usage reports and error reports. In addition, the software system can be configured to automatically send the reports to users of the laser imagers, automatically initiate an order to send additional imaging media, and automatically initiate a request for dispatch of a service technician in response to an error condition. As a further advantage, the software system can be configured to generate the image quality control reports in conformance with standards of regulatory agencies or other organizations regulating usage of laser imagers.

The features and advantages of the present invention will be set forth in part in the description that follows, and in part will be apparent from the description, or may be learned by practice of the present invention. The advantages of the present invention will be realized and attained by means particularly pointed out in the written description and claims hereof, as well as in the appended drawings.

To achieve the foregoing advantages, as broadly embodied and described herein, the present invention provides, in a first embodiment, a system for monitoring performance of a laser imager, the system comprising polling means for periodically polling the laser imager to acquire data from the laser imager, the data being representative of at least one performance condition associated with the laser imager, memory means for storing the data acquired by the polling means over a plurality of polling periods, and reporting means for generating a report representative of the data stored by the memory means over the plurality of polling periods.

In a second embodiment, the present invention provides a system for monitoring performance of each of a plurality of laser imagers located remotely from the system, the system comprising polling means for periodically polling each of the laser imagers to acquire data from the respective one of the laser imagers, the data being representative of at least one performance condition associated with the respective one of the laser imagers, memory means for storing the data acquired by the polling means from each of the laser imagers over a plurality of polling periods, and reporting means for generating a report representative of the data stored by the memory means for each of the laser imagers over the plurality of polling periods.

In a third embodiment, the present invention provides a system for monitoring performance of each of a plurality of laser imagers located remotely from the system, wherein each of the laser imagers forms an image on imaging media based on image data received from a plurality of different imaging modalities, the system comprising polling means for periodically polling each of the laser imagers to acquire data from the respective one of the laser imagers, the data being representative of an optical density associated with the image, an exposure level applied by the respective one of the laser imagers to the imaging media, and an amount of usage of the respective one of the laser imagers by each of the different imaging modalities, memory means for storing the data acquired by the polling means from each of the laser imagers over a plurality of polling periods, and reporting means for generating, based on the data stored by the memory means, an image quality control report for each of the laser imagers and a modality usage report for each of the laser imagers, wherein the reporting means calculates, based on the data representative of the optical density and the exposure level, parameters representative of a minimum optical density associated with the image, an optical density contrast associated with the image, and a development response of the imaging media, the image quality control report being representative of the parameters for a plurality of images formed on the imaging media by the respective one of the laser imagers, and wherein the modality usage report represents, over the plurality of polling periods, the amount of usage of the respective one of the laser imagers by each of the different imaging modalities.

In a fourth embodiment, the present invention provides an imaging system comprising a plurality of laser imagers, each of the laser imagers forming an image on an imaging media, polling means, located remotely from each of the laser imagers, for periodically polling each of the laser imagers to acquire data from the respective one of the laser imagers, the data being representative of at least one performance condition associated with the respective one of the laser imagers, memory means, located remotely from the laser imagers, for storing the data acquired by the polling means from each of the laser imagers over a plurality of polling periods, and reporting means, located remotely from the laser imagers, for generating a report representative of the data stored by the memory means for each of the laser imagers over the plurality of polling periods.

In a fifth embodiment, the present invention provides a system for monitoring a performance condition of each of a plurality of laser imagers located remotely from the system, each of the laser imagers forming an image on imaging media, the system comprising polling means for periodically polling each of the laser imagers to acquire data from the respective one of the laser imagers, the data being representative of an amount of usage of the imaging media by the respective one of the laser imagers, memory means for storing the data acquired by the polling means from each of the laser imagers over a plurality of polling periods, means for accumulating a media usage value for each of the laser imagers based on the amount of usage of the imaging media by the respective one of the laser imagers over a plurality of the polling periods, means for comparing the media usage value to a threshold, and means, responsive in the event the media usage value exceeds the threshold, for initiating an order to send an additional amount of the imaging media to a user of the respective one of the laser imagers.

In a sixth embodiment, the present invention provides a method for monitoring performance of at least one laser imager, the method comprising the steps of periodically polling the laser imager to acquire data from the laser imager, the data being representative of at least one performance condition associated with the laser imager, storing the data acquired in the polling step over a plurality of polling periods, and generating a report representative of the stored data over the plurality of polling periods.

In a seventh embodiment, the present invention provides a method for remotely monitoring performance of each of a plurality of laser imagers, the method comprising the steps of periodically polling each of the laser imagers remotely to acquire data from the respective one of the laser imagers, the data being representative of at least one performance condition associated with the respective one of the laser imagers, storing the data acquired in the polling step from each of the laser imagers over a plurality of polling periods, and generating a report representative of the stored data for each of the laser imagers over the plurality of polling periods.

In an eighth embodiment, the present invention provides a method for remotely monitoring performance of each of a plurality of laser imagers, wherein each of the laser imagers forms an image on an imaging media based on image data received from a plurality of different imaging modalities, the method comprising the steps of periodically polling each of the laser imagers remotely to acquire data from the respective one of the laser imagers, the data being representative of an optical density associated with the image, an exposure level applied by the laser imager to the imaging media, and an amount of usage of the respective one of the laser imagers by each of the different imaging modalities, storing the data acquired in the polling step from each of the laser imagers over a plurality of polling periods, and generating, based on the stored data, an image quality control report for each of the laser imagers and a modality usage report for each of the laser imagers, the step of generating the image quality report including calculating, based on the data representative of the optical density and the exposure level, parameters representative of a minimum optical density associated with the image, an optical density contrast associated with the image, and a development response of the imaging media, the image quality control report being representative of the parameters for a plurality of images formed on the imaging media by the laser imager, and wherein the modality usage report represents, over the plurality of polling periods, the amount of usage of the respective one of the laser imagers by each of the different imaging modalities.

In a ninth embodiment, the present invention provides a method for remotely monitoring at least one performance condition of each of a plurality of laser imagers, each of the laser imagers forming an image on imaging media, the method comprising the steps of periodically polling each of the laser imagers remotely to acquire data from the respective one of the laser imagers, the data being representative of an amount of usage of the imaging media by the respective one of the laser imagers, storing the data acquired in the polling step from each of the laser imagers over a plurality of polling periods, accumulating a media usage value for each of the laser imagers based on the amount of usage of the imaging media by the respective one of the laser imagers over a plurality of the polling periods, comparing the media usage value to a threshold, and initiating, in the event the media usage value exceeds the threshold, an order to send an additional amount of the imaging media to a user of the respective one of the laser imagers.

It is to be understood that both the foregoing general description and the following detailed description are exemplary and explanatory only, and not restrictive of the present invention, as claimed.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and together with the description serve to explain the principles of the invention.

FIG. 4 is an example of a tabular component of an image quality control report generated by a performance monitoring system, in accordance with the present invention;

FIG. 5 is an example of an alternative tabular component of an image quality control report generated by a performance monitoring system, in accordance with the present invention;

FIG. 8 is an example of a combined modality and media usage report generated by a performance monitoring system, in accordance with the present invention; and FIG. 9 is an example of an error report generated by a performance monitoring system, in accordance with the present invention.

DETAILED DESCRIPTION OF THE PREFERRED EMBODIMENT

Figure 1:
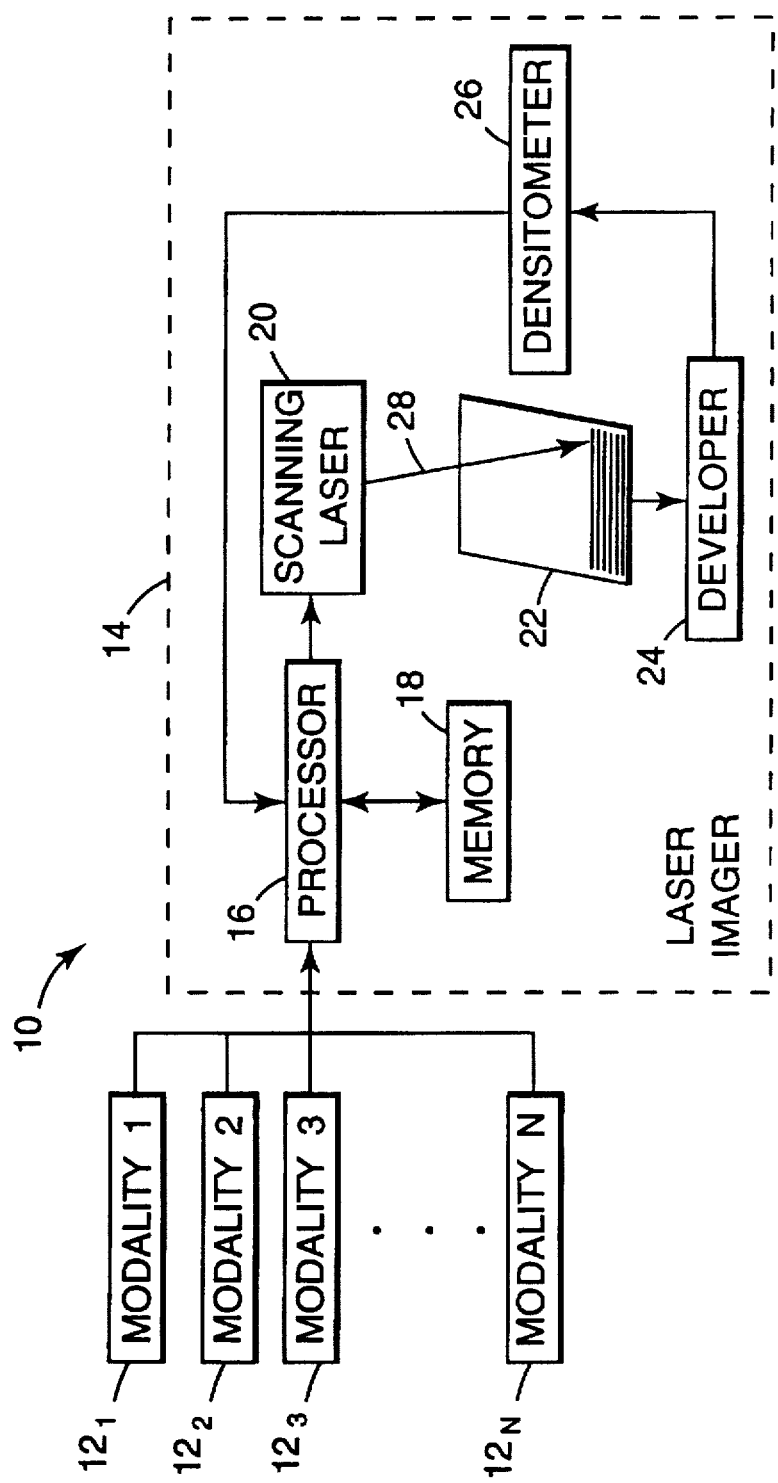
FIG. 1 is a functional block diagram of an existing medical imaging system.

FIG. 1 is a functional block diagram of an existing medical imaging system 10. The medical imaging system 10 includes one or more diagnostic imaging modalities $12_1-12_N$ and one or more laser imagers 14. The laser imager 14 includes a processor 16, a memory 18, a scanning laser 20 for exposing imaging media 22, a media developer 24, and a densitometer 26. Each modality $12_1-12_N$ comprises, for example, a medical diagnostic imaging device such as a magnetic resonance (MR), computed tomography (CT), conventional radiography (X-ray), or ultrasound device. The modality $12_1-12_N$ acquires an image of a physical object, such as a physiological object in a medical setting, and generates image data containing a plurality of digital image values representative of the image. Each of the digital image values represents an optical density at one of a plurality of pixels within the image.

The laser imager 14 is configured to form, based on the digital image values, a visible representation of the image acquired by modality $12_1$–$12_N$ on imaging media 22. The imaging media 22 may comprise a photosensitive film. The processor 16 of laser imager 14 converts the digital image values into laser drive values based on one of a plurality of conversion tables stored in memory 18. The conversion tables each correspond to a transfer function designed to produce a desired appearance characteristic, such as contrast or density, in the visible representation of the image. The system user may select a particular conversion table by actuating a control associated with a panel on laser imager 14 to select the desired appearance characteristic. Each of the laser drive values generated according to the conversion table represents an exposure level of scanning laser 20 at a particular pixel within the visible representation of the image formed on imaging media 22.

The processor 16 applies the laser drive values to scanning laser 20, which ordinarily comprises a laser diode, to modulate the intensity of laser beam 28 as it is scanned across imaging media 22. The modulated intensity determines the actual exposure level delivered to imaging media 22 by scanning laser 26 at each pixel. The media developer 24 processes media 22 to develop the areas exposed by laser 20. For a wet media-based laser imager, developer 24 comprises one or more controlled-temperature chemical baths. For a dry media-based imager, developer 24 comprises a thermal processor. Upon development of imaging media 22, the exposure levels delivered by scanning laser 20 result in desired optical densities at particular pixels. The desired optical densities are a function of the conversion table applied to the digital image values, and thus depend on the appearance characteristic desired by the system user. The resulting optical densities formed on imaging media 22 are determined not only by the conversion table, however, but also by variations in the sensitometric response of the imaging media, variations in the response of scanning laser 20 to the laser drive values, and variations in film processing conditions.

The processor 16 executes an automatic image quality control (AIQC) program designed, in part, to compensate for the above variations to produce a consistent output. The AIQC program identifies variations in the performance of laser imager 14 by periodically forming a test image on imaging media 22. The densitometer 26 is oriented to measure optical densities within imaging media 22 upon formation of the test image. A densitometer having structure suitable for incorporation in laser imager 14 is disclosed, for example, in U.S. Pat. No. 5,117,119, to Lemberger et al. The processor 16, under control of the AIQC program, periodically accesses memory 18 to obtain a set of calibration laser drive values. The processor 16 sends the calibration laser drive values to scanning laser 20, which then forms the test image. The test image may comprise, for example, a sensitometric pattern containing several optical density gradations. Upon development of imaging media 22 by developer 24, densitometer 26 performs optical density measurements on the test image and transmits the measurements to processor 16.

The processor 16 compares the measured densities to expected density values also stored in memory 18. The processor 16 stores the measured densities along with the date of the image test procedure in memory 18 as image test data for future reference when attempting to correct the variations. The expected density values reflect the ideal optical density values that would be produced on imaging media 22 in the absence of variations. If the measured optical density values deviate from the expected optical density values, processor 16 undertakes a correction routine to compensate for the deviation. Specifically, processor 16 either recalculates the contents of the conversion tables stored in memory 18 to adjust the laser drive values, or directly adjusts an attenuator (not shown) associated with scanning laser 20. The resulting laser drive values over-drive or under-drive scanning laser 20 to produce the desired output on imaging media 22 despite variations. Thus, processor 16 and densitometer 26, under control of the automatic image quality control (AIQC) program, together provide a control system that compensates for variations in both sensitometric response of imaging media 22 and processing conditions. A control system corresponding substantially to that described above is disclosed in copending U.S. patent application Ser. No. 07/981,075, of Schubert et al., the entire content of which is incorporated herein by reference. An example of a commercially available laser imager implementing an AIQC program as described above is the 969 HQ digital laser imager manufactured by Minnesota Mining & Manufacturing Company ("3M"), of St. Paul, Minn.

The image test data stored by processor 16 in memory 18 may farther include a temperature of developer 24 during development of the exposed test image. The laser imager 14 includes a heating element for heating either a chemical bath or a thermal processor associated with developer 24. A sensor, such as a thermocouple or thermistor, is provided for the heating element as a means to measure the temperature of developer 24. The processor 16 is communicatively coupled to the sensor, and receives temperature measurements to control the temperature. The processor 16 also records the temperature of developer 24 in memory 18 as test data. The temperature of developer 24 directly affects the development of imaging media 22 and therefore assists in analyzing the cause of variations in the resulting optical density measurements taken by densitometer 26.

Another element of the image test data is the type of imaging media 22 used in the image test procedure. The laser imager 14 includes a media type determining device for identifying the type of imaging media 22 and providing the identification data to processor 16. The type of media 22 determines the sensitometric response to different exposure levels applied by scanning laser 20 and therefore is important to analysis of the image test data. The media type determining device may comprise, for example, a bar code scanner oriented to read a bar code affixed to packaging associated with imaging media 22. The bar code identifies the type of imaging media 22 by an emulsion number and also may identify the lot of the media if desired. The media type determining device decodes the bar code and transmits the identification to processor 16, under control of the AIQC program. The processor 16 stores the identification as image test data in memory 18 along with the optical density measurements taken by densitometer 26 and the temperature measurements taken by the temperature sensor associated with developer 24.

In addition to compensating for variations that can affect image quality, the laser imager 14 also monitors a number of system conditions indicative of performance. When a particular modality $12_1$–$12_N$ sends image data to laser imager 14, for example, processor 16 notes the identity of the modality and enters the identity as usage data in a log stored in memory 18. The processor 16 determines the identity of the particular modality $12_1$–$12_N$ by reference to a modality identifier entered in memory 18 by the installer of the modality. The processor 16 also may enter in the log as usage data the amount of imaging media 22 used by the particular modality $12_1$–$12_N$. In this manner, processor 16 maintains a log of the type and number of imaging operations performed by laser imager 14 for future reference when analyzing usage and performance. As a further step, processor 16 may also enter in the log usage data concerning the type of imaging media 22 used by the particular modality $12_1$–$12_N$, and conceivably the time laser imager 14 performed a particular imaging operation.

The processor 16 also monitors the status of several electromechanical elements within laser imager 14. A detailed discussion of the various electromechanical elements within laser imager 14 is beyond the scope of this document. As examples, however, laser imager 14 includes a media drawer that extends outward to receive a cartridge containing imaging media 22, a first media transfer device that withdraws the imaging media from the media cartridge and places the imaging media in position for exposure by scanning laser 20, and a second media transfer device that moves the exposed imaging media from the scanning laser to developer 24. Each electromechanical element includes a sensor, oriented to sense essentially correct or incorrect operation, that is communicatively coupled to processor 16. The processor 16 senses correct or incorrect operation of each of the electromechanical elements, and records incorrect operations as errors in a log stored in memory 18. The error log preferably includes the type, date, and time of the error and the type of imaging media 22 used during occurrence of the error. The processor 16 may also enter in the log a "tally" representing the frequency of each type of error. The error log provides an indication of part failure and serves as a guide for trouble-shooting. The processor 16 maintains the contents of the error log until a reset request is received.

As discussed above, the optical densities formed on imaging media 22 may be subject to variation due to variations in laser imager 14 and/or environmental conditions. If laser imager 14 fails to produce the appearance characteristic desired by the system user, due to any of the above variations, the diagnostic value of the image can be seriously impaired. Although the AIQC program executed by processor 16 is designed to produce a consistent output on imaging media 22, hospital staff continue to independently monitor system variations both as a precaution and as a regulatory requirement. Specifically, daily image quality control reports are mandated by government regulatory agencies or other regulatory organizations to ensure careful monitoring of the output of laser imager 14 by imaging staff. This monitoring can help detect variations that could otherwise adversely affect image quality and possibly necessitate a "re-shoot" of the patient by the modality $12_1$–$12_N$. Unfortunately, the generation of image quality control reports in existing medical imaging systems requires significant manual effort by a skilled technician.

Figure 2:
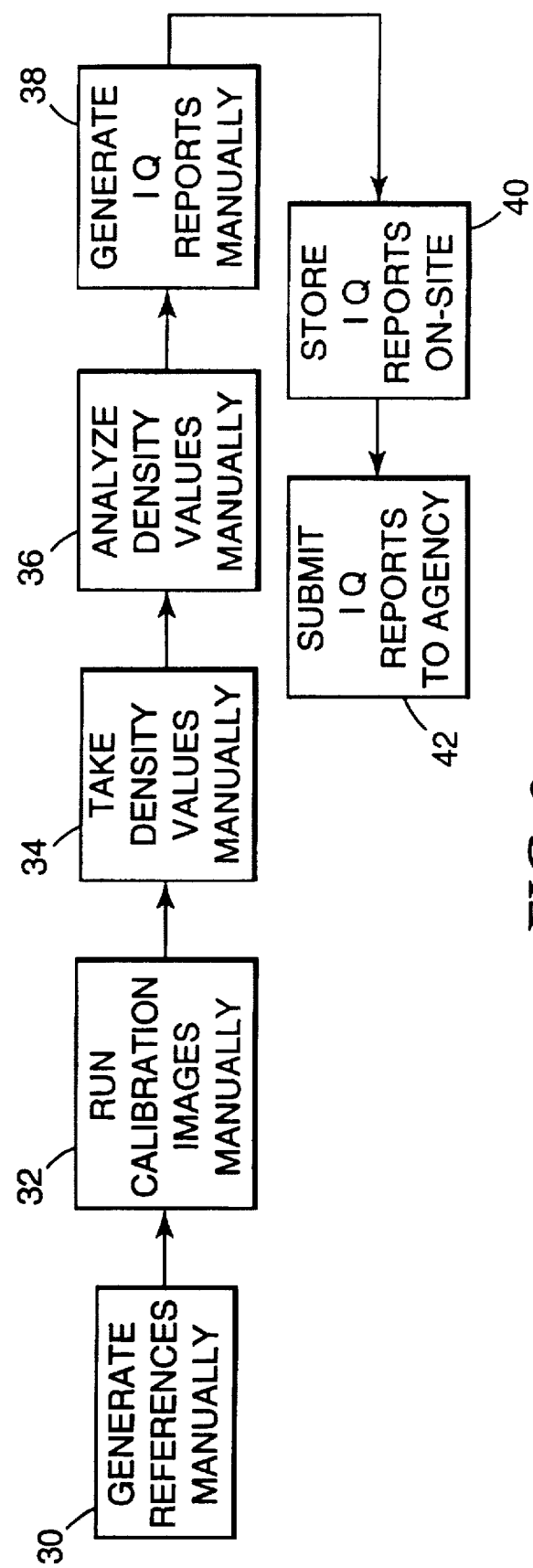
FIG. 2 is a flow diagram of an existing manual technique for generating image quality control reports for a laser imager.

FIG. 2 is a flow diagram illustrating an existing manual technique for generating image quality control reports for laser imager 14. To initiate a systematic program of image quality control, a trained technician must first obtain a set of reference densities by forming a reference image on a sheet of imaging media, as indicated by block 3 0. The reference image is a twenty-one step sensitometric pattern containing optical density gradations extending from approximately 0.0 to 3.0 in steps of 0.15. If different types of imaging media will be used, the technician must run a reference image for each type. In this manner, the technician obtains references for the varying sensitometric responses of the different types of imaging media. The technician typically forms the reference image by manually exposing the sheet of imaging media with a sensitometer. After repeating the above process for several days, the technician manually measures the optical densities within the reference images to obtain base+fog, a contrast index, and a speed index. The technician averages the above parameters to obtain references, and calculates a tolerance for each reference.

After obtaining the references, the technician begins to perform a daily image quality procedure. Each day, the technician runs the test image on laser imager 14 for several sheets of imaging media, as indicated by block 32. The technician typically runs the test image by actuating a manual control on a panel associated with laser imager 14. In response, processor 16 accesses memory 18 to obtain the set of calibration laser drive values used for a image test procedure. The processor 16 applies the calibration laser drive values to scanning laser 20, which exposes imaging media 22 to form the test image. Once laser imager 14 has formed and developed the test image on imaging media 22, the technician manually performs a set of densitometry measurements on the test image, as indicated by block 34. As indicated by block 36 of FIG. 2, the technician analyzes the densitometry measurements and the expected exposure levels delivered by scanning laser 20 in response to the calibration laser drive values to calculate a set of parameters required for the image quality control report. The parameters typically include base+fog, the optical contrast index, and the speed index.

The technician uses the parameters to generate an image quality control report for that day, as indicated by block 38, and then stores the report on-site, as indicated by block 40, either in the form of a hard copy or a file stored in a computer memory device. The technician eventually retrieves the daily image quality control reports that have been generated over a period of time, and compiles them for submission to the applicable regulatory organization, as indicated by block 42. The technician also uses the image quality control reports as a measure of image quality provided by laser imager 14. The technician determines whether the parameters fall within the applicable tolerances established for the references to assess image quality and perhaps identify sources of variation. The technician may respond to deviation from the tolerances by adjusting the characteristics of developer 24. In a wet chemical-based laser imager 14, for example, the image quality control reports may reveal a trend that indicates to a trained technician that the chemistry in developer 24 needs to be adjusted. Thus, the image quality control reports not only ensure compliance with the requirements of the regulatory organization, but also provide a valuable instrument by which the technician can continuously monitor performance of laser imager 14 over a period of time. Nevertheless, the manual nature of the process demands a significant amount of time and effort by the technician that seemingly could be better spent on other important tasks.

Figure 3:
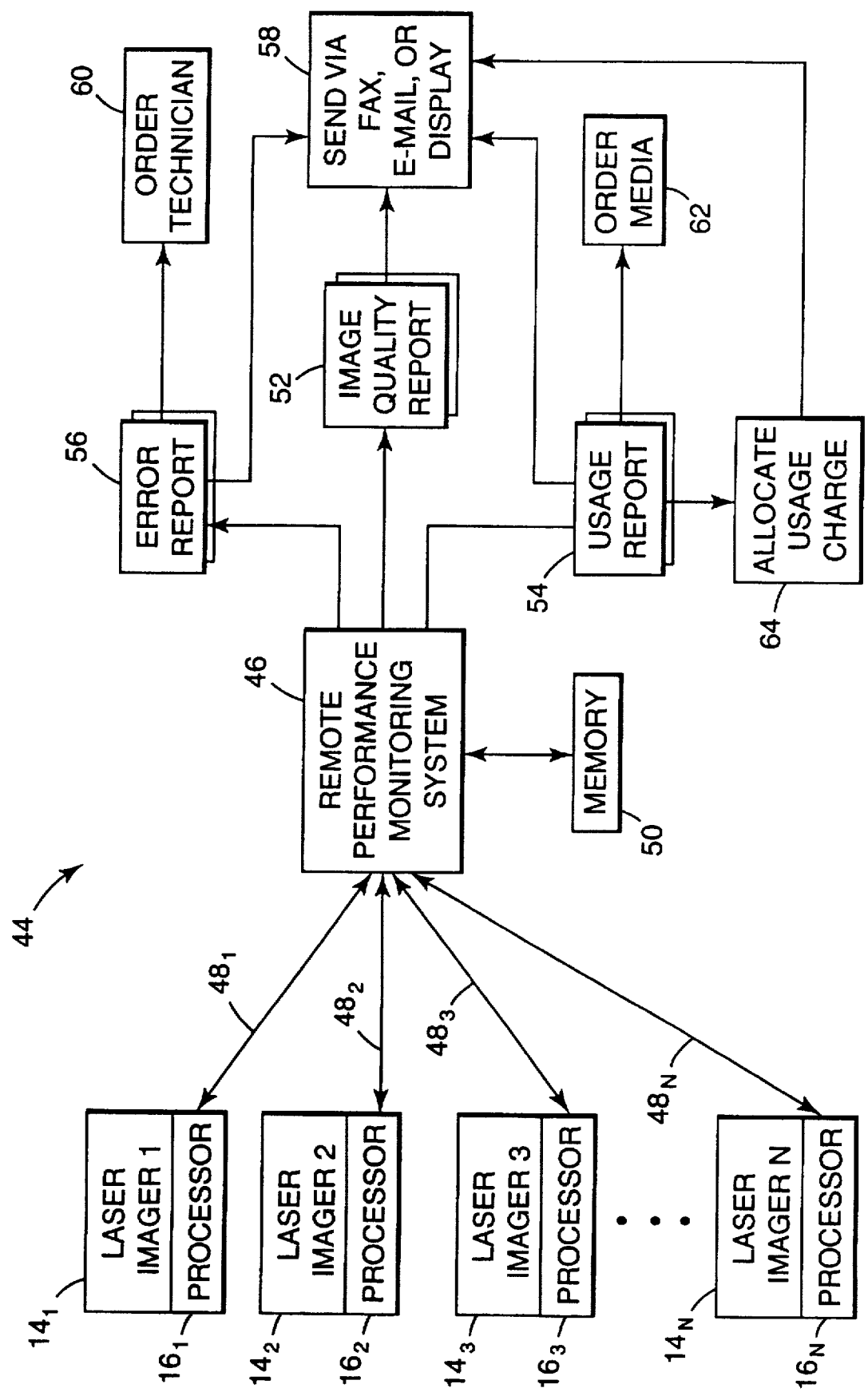
FIG. 3 is a functional block diagram of a laser imager system incorporating a performance monitoring system, in accordance with the present invention.

FIG. 3 is a functional block diagram of a laser imager system 44 incorporating a performance monitoring system 46, in accordance with the present invention. It will be recognized, in view of this disclosure, that performance monitoring system 46 can be implemented on-site with a laser imager 14. However, performance monitoring system 46 preferably is configured to monitor the performance of one or more laser imagers $14_1$–$14_N$ located remotely from the system. It will be further recognized that remote performance monitoring system 46, as described herein, provides a means for implementing a remote performance monitoring method, in accordance with the present invention. The performance monitoring system 46 automatically monitors one or more remotely located laser imagers $14_1$–$14_N$ over a period of time to generate image quality control reports, eliminating the need for manual generation of such reports by a technician. The performance monitoring system 46 also monitors modality usage, imaging media usage, and the occurrence of errors for each laser imager $14_1$–$14_N$, and automatically generates usage reports and error reports. In addition, system 46 is capable of automatically sending the reports to users of laser imagers $14_1$–$14_N$, automatically initiating an order to send additional imaging media 22, and automatically initiating a request for dispatch of a service technician in response to an error condition. As a further advantage, system 46 is capable of generating the image quality control reports in conformance with standards of regulatory agencies or other organizations regulating usage of laser imagers $14_1$–$14_N$.

The performance monitoring system 46, in accordance with the present invention, can be realized by a software system configured to run on a UNIX™ computer operating system. The performance monitoring system 46 preferably monitors one or more of laser imagers $14_1$–$14_N$ distributed over a geographic region. For this reason, system 46 preferably is configured to communicate with laser imagers $14_1$–$14_N$ by modem via public telephone lines $48_1$–$48_N$, as shown in FIG. 3. A memory 50 associated with system 46 stores an access table and a polling table that guide system 46 in accessing laser imagers $14_1$–$14_N$. The polling table defines a schedule for periodically polling each of laser imagers $14_1$–$14_N$. The schedule may require, for example, that system 46 poll each laser imager $14_1$–$14_N$ on a daily basis. The access table contains the telephone numbers for each of the remotely located laser imagers $14_1$–$14_N$ to be monitored by system 46. The performance monitoring system 46 periodically polls each of laser imagers $14_1$–$14_N$ to acquire data representative of one or more performance conditions. The system 46 polls each laser imager $14_1$–$14_N$ by continuously accessing the polling table to determine the next laser imager to be monitored, and then accessing the access table to associate a telephone number with the particular laser imager.

The performance monitoring system 46 dials up the telephone number of the appropriate laser imager $14_1$–14 by modem over telephone line $48_1$–$48_N$. Once communication is established with the laser imager $14_1$–$14_N$, system 46 interfaces with the processor $16_1$–$16_N$ associated with the particular laser imager $14_1$–$14_N$. The system 46 uses processor $16_1$–$16_N$ to acquire from memory 18 of laser imager 14 data representative of performance conditions. Specifically, system 46 obtains from memory 18 the image test data stored by the AIQC program executed by processor $16_1$–$16_N$. The image test data is representative of the results of the most recent image test procedure since the last polling period. In addition, system 46 obtains from memory 18 the usage data logged by processor $16_1$–$16_N$ concerning the amount of usage of laser imager $14_1$–$14_N$ by different modalities $12_1$–$12_N$, and the amount of imaging media used for imaging operations requested by the modalities, since the last polling period. Finally, system 46 obtains from memory 18 the error data logged by processor $16_1$–$16_N$ detailing any errors that may have occurred, as well as any "tally" data concerning the frequency of each type of error.

The performance monitoring system 46 stores all of the above data obtained from a particular laser imager $14_1$–$14_N$ in a memory 50 for reference in generating a variety of reports representative of the data. With reference to FIG. 3, system 46 uses the data stored in memory 50 to generate one or more of: (1) an image quality control report representing various parameters indicative of imaging performance by the laser imager $14_1$–$14_N$, as indicated by block 52; (2) a combined modality/media usage report representing the usage of laser imager by different modalities $12_1$–$12_N$ and the amount of imaging media 22 used by the laser imager, as indicated by block 54; and (3) an error report representing the occurrence of errors within the laser imager, as indicated by block 56. As indicated by block 58, system 46 also is configured to automatically send any of the above reports to a user associated with each laser imager $14_1$–$14_N$. The system 46 may send the reports, for example, via facsimile transmission, electronic mail, or by postal service. Alternatively, system 46 may send a request to processor 16 to visibly display the report on a display panel associated with laser imager $14_1$–$14_N$. As a further alternative, system 46 may send a request to processor 16 to print the report on a sheet of imaging media 22.

In addition, system 46 is configured to automatically initiate a request for a service technician, as indicated by block 60, in response to an error condition at a particular laser imager $14_1$–$14_N$ sensed during generation of the error report. As indicated by block 62, system 46 further is configured to automatically initiate an order to send additional imaging media 22 to a particular laser imager $14_1$–$14_N$ in response to a media usage condition sensed during generation of the usage report. Finally, as indicated by block 64, system 46 can be configured to allocate a monetary charge to each of the different modalities $12_1$–$12_N$ proportional to the amount of usage of the particular laser imager $14_1$–$14_N$. As shown in FIG. 3, the monetary charge also can be automatically sent to a user of a particular laser imager $14_1$–$14_N$, thereby eliminating the need for modality accounting by hospital staff.

To generate the image quality control report, system 46 accesses the image test data stored in memory 50 for a particular laser imager $14_1$–$14_N$ over a plurality of polling periods. The image test data stored in memory 50 represents, for each image test procedure, the optical densities measured in the test image by densitometer 26, the corresponding exposure levels applied by scanning laser 20 in response to the calibration laser drive values to generate the optical densities, the temperature of developer 24 during the image test procedure, the type of imaging media 22 used to form the test image, and the date of the image test procedure. Based on the image test data, system 46 calculates a set of parameters to be represented in the image quality control report. In particular, system 46 may calculate a minimum optical density and a maximum optical density among the optical densities measured in the test image by densitometer 26. The system 46 also calculates an optical density contrast index for the test image, and a "speed" index representative of the development response of imaging media 22 to the exposure levels applied by scanning laser 20. The optical density contrast index is calculated by selecting a density measurement closest to, but not larger than, a density of 2.20, and subtracting from that density measurement the density measurement closest to, but not lower then, 0.45. The speed index is calculated by selecting the density measurement closest to but not exceeding a density of 1.0, and adding to that density measurement the minimum optical density measurement, or "base+fog."

FIG. 4 is an example of a tabular component 66 of an image quality control report generated by performance monitoring system 46, in accordance with the present invention. After calculating the above parameters for each image test procedure, system 46 compiles them in a tabular form along with the date of the image test procedure, the pertinent developer temperature, and the media type, as may be represented by an emulsion number. In the example of FIG. 4, the tabular component 66 of the image quality control report includes, from left to right, a date column indicating the dates (Oct. 1–9, 1994) of the particular image test procedures, the minimum measured optical density, a maximum measured optical density, the speed index, the contrast index, the developer temperature, and the media type. The tabular component 66 of the image quality control report in FIG. 4 also includes the date (Oct. 18, 1994) the report was generated by system 46, the location ("HOSPITAL NAME") of the particular laser imager $14_1$–$14_N$ for which the report was generated, and the model and serial numbers of the particular laser imager. The tabular component 66 shown in FIG. 4 is intended to be purely exemplary, with its form and content being subject to variation according to the needs of a user. It is noted, however, that system 46 can advantageously configure the form and content to conform to standards of a government regulatory agency or other organization regulating laser imagers $14_1$–$14_N$. In this manner, system 46 eliminates the manual effort previously required by hospital staff to generate an image quality control report.

FIG. 5 is an example of an alternative tabular component 68 of an image quality control report generated by performance monitoring system 46, in accordance with the present invention. The example shown in FIG. 5 substantially corresponds to that shown in FIG. 4, but incorporates a different set of parameters indicative of image quality. Specifically, as shown in FIG. 5, system 46 configures tabular component 68 of the image quality control report to include, from left to right, the dates (Nov. 1–18, 1994) of the particular image test procedures, a measured mid-tone optical density, an AIQC speed, the developer temperature, and the media type. The measured mid-tone optical density represents the actual measured optical density at a gradation expected to correspond to a mid-tone density value of 1.0. The mid-tone optical density measured for the test image indicates the deviation from the ideal mid-tone density value, and thus provides a useful indicator of imaging quality. The AIQC speed is an alternative speed index that represents the log exposure value at which media 22 reaches a maximum optical density Dmax. The AIQC speed can be readily calculated by system 46 by reference to the density measurements and corresponding exposure values included in the image test data obtained from laser imager 14. In addition, system 46 includes in tabular component 68 of the image quality control report an indication of whether the AIQC program for the particular laser imager $14_1$–$14_N$ was active or inactive at the time of the image test procedure. That is, system 46 determines whether the parameters deviate from corresponding reference values by more than a given tolerance. The reference values can be based on precalculated values stored in memory for particular types of film. Excessive deviation may be an indication that the AIQC program is unable to adequately compensate a particular laser imager $14_1$–$14_N$ for system variations. This indication suggests to the system user that a correction is necessary, such as a change in the chemistry of developer 24.

Figure 6A:
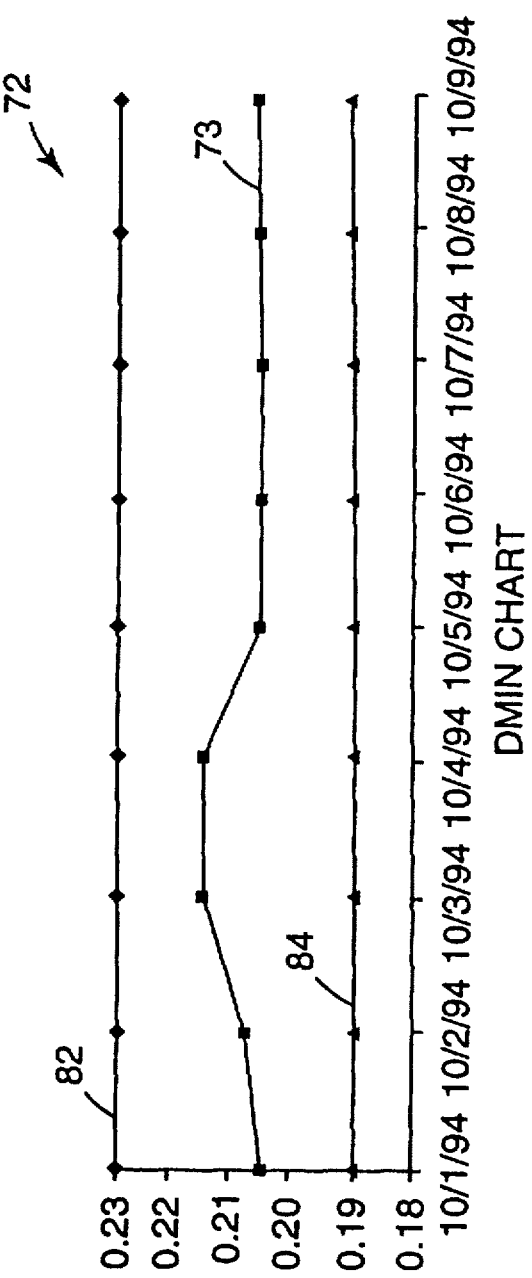
FIG. 6 is an example of a graphical component of an image quality control report generated by a performance monitoring system, in accordance with the present invention.
Figure 6B:
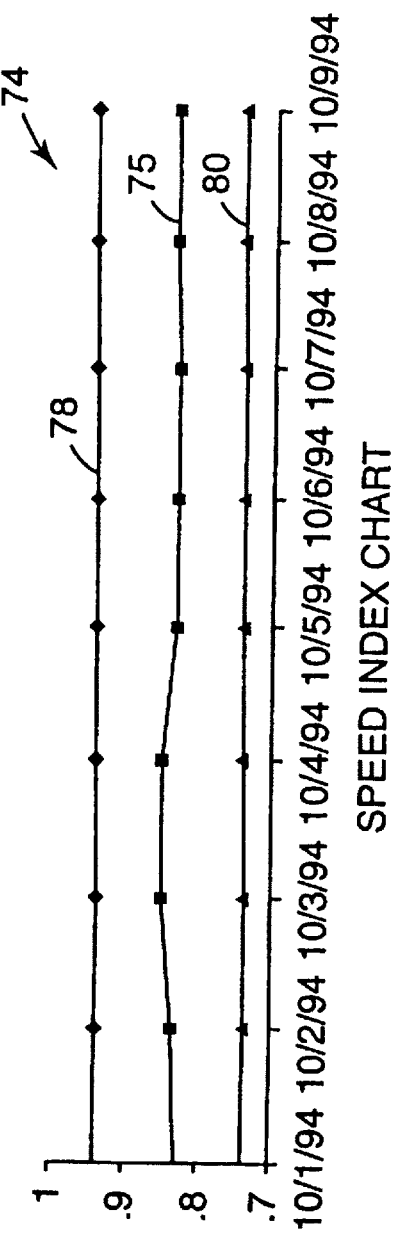
Figure 6C:
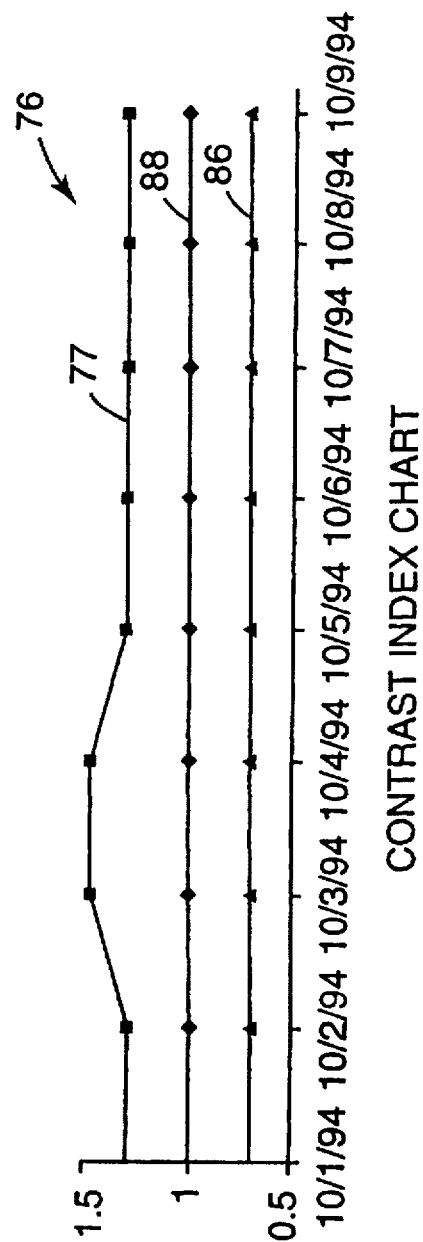

FIG. 6 is an example of a graphical component 70 of an image quality control report generated by remote performance monitoring system 46, in accordance with the present invention. Like the tabular components of FIGS. 4 and 5, the graphical component 70 of FIG. 6 includes the date (Oct. 18, 1994) the report was generated by system 46, the location ("HOSPITAL NAME") of the particular laser imager $14_1$–$14_N$ for which the report was generated, and the model and serial numbers of the particular laser imager. However, graphical component 70 of FIG. 6 displays a set of graphs having an x-axis with the dates of particular image test procedures, and a y-axis with image test parameters such as minimum optical density, maximum optical density, optical contrast index, and speed index. In the example of FIG. 6, the graphical component 70 of the image quality control report includes a minimum optical density (Dmin=base+ fog) chart 72 having a line 73 representative of Dmin, a speed index chart 74 having a line 75 representative of the speed index, and a contrast index chart 76 having a line 77 representative of the contrast index. As shown in FIG. 6, the individual charts may include reference lines indicating appropriate ranges for the particular parameters, based on reference values. Deviation from the ranges may indicate poor image quality. For example, speed index chart 74 includes a reference line 78 indicating a maximum speed index and a reference line 80 indicating a minimum speed index. Similarly, Dmin chart 72 includes a reference line 82 indicating a maximum Dmin value and a reference line 84 indicating a minimum Dmin value. Finally, contrast index chart 76 includes a reference line 86 at a minimum contrast index and a reference line 88 at a contrast index of 1.0.

Figure 7A:
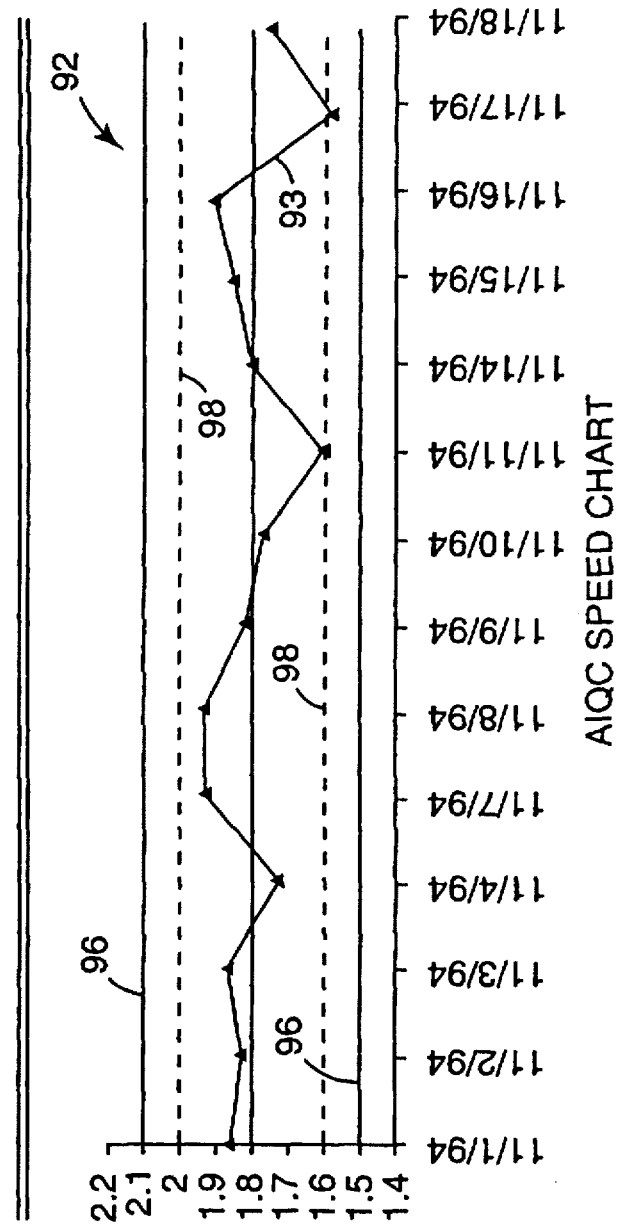
FIG. 7 is an example of an alternative graphical component of an image quality control report generated by a performance monitoring system, in accordance with the present invention.
Figure 7B:
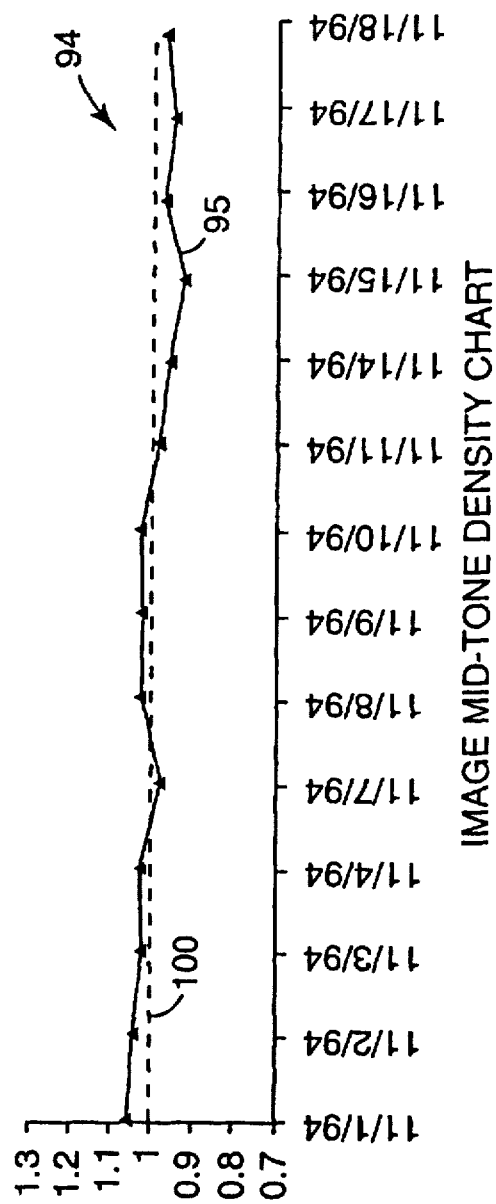

FIG. 7 is an example of an alternative graphical component of an image quality control report generated by remote performance monitoring system 46, in accordance with the present invention. The graphical component 90 corresponds substantially to that shown in FIG. 6, but incorporates a different combination of charts. Specifically, graphical component 90 of FIG. 7 includes an AIQC speed chart 92 having a line 93 representative of the AIQC speed, which can be calculated as discussed above with respect to FIG. 5. The graphical component 90 further includes an image mid-tone density chart 94 having a line 95 representative of the mid-tone density. The charts 92, 94 graphically represent the AIQC speed and mid-tone density, respectively, shown in tabular component 68 of FIG. 5. Further, AIQC speed chart 92 of FIG. 7 includes a solid reference line 96 indicating a speed point outside of which the AIQC program may be inactive, and a dashed reference line 98 indicating a speed point outside of which the chemistry of developer 24 should be checked. The image mid-tone density chart 94 of FIG. 7 includes a dotted reference line 100 at the ideal mid-tone density value of 1.0.

To generate the combined modality/media usage report, system 46 accesses the usage data stored in memory 50 for a particular laser imager $14_1$–$14_N$ over a plurality of polling periods. The usage data stored in memory 50 represents the amount of usage of the particular laser imager $14_1$–$14_N$ by each modality $12_1$ –12N coupled to the laser imager over a plurality of polling periods, in terms of the number of imaging operations requested, and the amount of imaging media used by the laser imager for each modality. The system 46 includes the modality usage data in the combined modality/media usage report. In addition, based on the modality usage data, system 46 may allocate a monetary charge to each of the different modalities $12_1$–$12_N$, and automatically send a report to a user of the particular laser imager $14_1$–$14_N$ listing the charges. The monetary charge allocated to each of the modalities $12_1$–$12_N$ is proportional to the amount of usage of the particular laser imager $14_1$–$14_N$.

The system 46 also obtains the media usage data from memory 50 to determine the amount of imaging media 22 used for inclusion in the combined modality/media usage report. At the same time, system 46 accumulates a media usage value based on the amount of usage of imaging media 22 over a plurality of polling periods. Over consecutive polling periods, system 46 continuously compares the running media usage value to a threshold to determine whether the user of the particular laser imager $14_1$–$14_N$ should be sent an additional amount of imaging media 22. If the media usage value exceeds the threshold, system 46 automatically initiates an order to send an additional amount of imaging media 22 to the user of the particular laser imager $14_1$–$14_N$. After determining modality and media usage, system 46 compiles them in a combined modality/media usage report.

FIG. 8 is an example of a combined modality/media usage report 102 generated by performance monitoring system 46, in accordance with the present invention. As shown in FIG. 8, modality/media usage report 102 includes the date (Oct. 18, 1994) the report was generated by system 46, the location ("HOSPITAL NAME") of the particular laser imager $14_1$–$14_N$ for which the report was generated, and the model and serial numbers of the particular laser imager. The modality/media usage report 102 further includes the particular modality $12_1$–$12N$ ("GE CT," etc.) requesting imaging operations, the number of imaging media 22 used by laser imager $14_1$–$14_N$ for each modality, and the total number of imaging media used. The modality/media usage report 102 could include additional information such as the time each imaging operation was requested to provide an indication of high imaging activity during certain times of the day. Like the image quality control report, the modality/media usage report shown in FIG. 6 is intended to be purely exemplary, with its form and content being subject to variation according to the needs of users.

To generate the error report, system 46 accesses the error data stored in memory 50 for a particular laser imager $14_1$–$14_N$ over a plurality of polling periods. The error data stored in memory 50 details any errors that occurred within the particular laser imager $14_1$–$14_N$ since the last polling period, providing the type of error, the time the error occurred, and the type of imaging media 22 being used when the error occurred. The errors may include incorrect operation of various electromechanical components within laser imager $14_1$–$14_N$, as sensed by processor $16_1$–$16_N$. The system 46 includes in the error report all errors logged since the last polling period for analysis by a technician and/or a user of the laser imager $14_1$–$14_N$. The system 46 also may include the frequency of each type of error for a particular laser imager $14_1$–$14_N$. The system 46 compares the frequency of each type of error to a threshold. If the frequency of a particular error exceeds the threshold, system 46 recognizes a potential oncoming fault condition and automatically initiates an order for a service technician to visit the location associated with the particular laser imager $14_1$–$14_N$. Thus, system 46 enables a degree of anticipation of conditions that could render the laser imager $14_1$–$14_N$ unusable, and proactively initiates a service call without the need for a request by the user of the laser imager. As a further advantage, system 46 could be provided with a direct interface to a service management system (SMS), such as OpenUPTIME™, to log a service call for assignment and scheduling by a dispatcher using the SMS.

FIG. 9 is an example of an error report 104 generated by performance monitoring system 46, in accordance with the present invention. As shown in FIG. 9, error report 104 includes the date (Oct. 18, 1994) the report was generated by system 46, the location ("HOSPITAL NAME") of the particular laser imager $14_1$–$14_N$ for which the report was generated, and the model and serial numbers of the particular laser imager. The error report 104 further includes the type of imaging media 22 used when the error occurred, the type of error ("Error Descriptor"), the frequency ("Counts") of errors of that type, the first occurrence of that type of error, and the last occurrence of that type of error. The "Error Descriptor" column of the error report provides an example of some of the different types of errors that may be logged for a laser imager $14_1$–$14_N$. In FIG. 9, for example, the "Error Descriptor" column includes an FLMASL ("film almost slow") error, indicating that the AIQC speed has reached an almost unacceptable level, an EOFTMO ("end of film timeout error") error, indicating an end-of-film has not been received for an image data file within an acceptable amount of time, and an RWDUNITTRIG ("rewind unit trigger error") error, indicating a rewind unit associated with laser imager 14 has incurred a trigger error. The error report 104 provides the user and/or technician with useful information for trouble-shooting problems that can affect image quality or disable the laser imager $14_1$–$14_N$. The form and content of the information included in the error report of FIG. 7 is purely exemplary, however, and may supplemented or modified according to the individual needs of a user.

Having described the exemplary embodiments of the invention, additional advantages and modifications will readily occur to those skilled in the art from consideration of the specification and practice of the invention disclosed herein. Therefore, the specification and examples should be considered exemplary only, with the true scope and spirit of the invention being indicated by the following claims.

What is claimed is:

1. A system for monitoring performance of a medical laser imager, the laser imager forming medical diagnostic images on radiation-sensitive imaging media, the system comprising:

polling means for periodically polling said laser imager to acquire data from said laser imager, said data being representative of at least one performance condition associated with said laser imager, wherein said data representative of said at least one performance condition includes data representative of an optical density associated with each of said images on said imaging media;

memory means for storing said data acquired by said polling means over a plurality of polling periods; and reporting means for generating a report representative of the data stored by said memory means over said plurality of polling periods.

2. The system of claim 1, wherein said data representative of said at least one performance condition is further representative of an exposure level applied by said laser imager to said imaging media for formation of said images, said reporting means calculating, based on said data, parameters representative of a minimum optical density associated with said image, an optical density contrast associated with said image, and a development response of said imaging media, said report including an image quality report representative of said parameters for a plurality of images formed on said imaging media by said laser imager.

3. The system of claim 2, wherein said means for generating said report includes means for generating said report in conformance with standards of an organization regulating usage of said laser imager.

4. The system of claim 1, further comprising means for sending said report to a user of said laser imager via at least one of facsimile transmission, electronic mail, and a display associated with said laser imager.

5. The system of claim 1, wherein said data representative of said at least one performance condition includes data representative of an amount of usage of said imaging media, said system further comprising:

means for accumulating a media usage value based on the amount of usage of said imaging media over a plurality of said polling periods;

means for comparing said media usage value to a media usage threshold; and means, responsive in the event said media usage value exceeds said media usage threshold, for initiating an order to send an additional amount of said imaging media to a user of said laser imager.

6. The system of claim 1, wherein said laser imager forms said images on said imaging media in response to image data generated by a plurality of different imaging modalities, and said data representative of said at least one performance condition further includes data representative of an amount of usage of said laser imager by each of said different imaging modalities, said report including a modality usage report representative of said amount of usage of said laser imager by each of said different imaging modalities.

7. The system of claim 6, further comprising means for allocating a monetary charge to each of said different imaging modalities, said monetary charge being proportional to the amount of usage of said laser imager by the respective one of said different imaging modalities.

8. The system of claim 1, wherein said laser imager is located remotely from said system.

9. A system for monitoring performance of each of a plurality of medical laser imagers located remotely from said system, each of said laser imagers forming medical diagnostic images on radiation-sensitive imaging media, the system comprising:

polling means for periodically polling each of said laser imagers to acquire data from the respective one of said laser imagers, said data being representative of at least one performance condition associated with the respective one of said laser imagers, wherein said data representative of said at least one performance condition includes data representative of an optical density associated with each of said images on said imaging media;

memory means for storing said data acquired by said polling means from each of said laser imagers over a plurality of polling periods; and reporting means for generating a report representative of the data stored by said memory means for each of said laser imagers over said plurality of polling periods.

10. The system of claim 9, wherein said data representative of said at least one performance condition is further representative of an exposure level applied by the respective one of said laser imagers to said imaging media for formation of said images, said reporting means calculating, based on said data, parameters representative of a minimum optical density associated with said image, an optical density contrast associated with said image, and a development response of said imaging media, said report including an image quality report representative of said parameters for a plurality of images formed on said imaging media by the respective one of said laser imagers.

11. The system of claim 10, wherein said means for generating said report includes means for generating said report in conformance with standards of an organization regulating usage of said laser imagers.

12. The system of claim 9, further comprising means for sending said report to a user of each of said laser imagers via at least one of facsimile transmission, electronic mail, and a display associated with the respective one of said laser imagers.

13. The system of claim 9, wherein said data representative of said at least one performance condition is further representative of an amount of usage of said imaging media, said system further comprising:

means for accumulating a media usage value for each of said laser imagers based on the amount of usage of said imaging media by the respective one of said laser imagers over a plurality of said polling periods;

means for comparing said media usage value to a media usage threshold; and means, responsive in the event said media usage value exceeds said media usage threshold, for initiating an order to send an additional amount of said imaging media to a user of the respective one of said laser imagers.

14. The system of claim 9, wherein each of said laser imagers forms said images on said imaging media in response to image data generated by a plurality of different imaging modalities, and said data representative of said at least one performance condition is further representative of an amount of usage of the respective one of said laser imagers by each of said different imaging modalities.

15. The system of claim 14, further comprising means for allocating a monetary charge to each of said different imaging modalities, said monetary charge being proportional to the amount of usage of the respective one of said laser imagers by the respective one of said different imaging modalities.

16. A system for monitoring performance of each of a plurality of medical laser imagers located remotely from said system, wherein each of said laser imagers forms a medical diagnostic image on radiation-sensitive imaging media based on image data received from a plurality of different imaging modalities, the system comprising:

polling means for periodically polling each of said laser imagers to acquire data from the respective one of said laser imagers, said data being representative of an optical density associated with said image, an exposure level applied by the respective one of said laser imagers to said imaging media, and an amount of usage of the respective one of said laser imagers by each of said different imaging modalities;

memory means for storing said data acquired by said polling means from each of said laser imagers over a plurality of polling periods; and reporting means for generating, based on said data stored by said memory means, an image quality control report for each of said laser imagers and a modality usage report for each of said laser imagers, wherein said reporting means calculates, based on said data representative of said optical density and said exposure level, parameters representative of a minimum optical density associated with said image, an optical density contrast associated with said image, and a development response of said imaging media, said image quality control report being representative of said parameters for a plurality of images formed on said imaging media by the respective one of said laser imagers, and wherein said modality usage report represents, over said plurality of polling periods, said amount of usage of the respective one of said laser imagers by each of said different imaging modalities.

19

17. The system of claim 16, wherein said means for generating said image quality control report includes means for generating said image quality control report in conformance with standards of an organization regulating usage of said laser imagers.

18. The system of claim 16, further comprising means for sending said image quality control report and said modality usage report to a user of each of said laser imagers via at least one of facsimile transmission, electronic mail, and a display associated with the respective one of said laser imagers.

19. The system of claim 16, wherein said data is further representative of an amount of usage of said imaging media, said system further comprising:
  means for accumulating a media usage value for each of said laser imagers based on the amount of usage of said imaging media by the respective one of said laser imagers over a plurality of said polling periods;
  means for comparing said media usage value to a media usage threshold; and
  means, responsive in the event said media usage value exceeds said media usage threshold, for initiating an order to send an additional amount of said imaging media to a user of the respective one of said laser imagers.

20. The system of claim 16, wherein said data is further representative of an error condition in the respective one of said laser imagers, wherein said means for generating said image quality control report and said modality usage report include means for generating an error report for each of said laser imagers, said error report representing said error condition over said plurality of polling periods.

21. The system of claim 20, further comprising means, responsive to said error condition, for initiating a request for dispatch of a service technician to the respective one of said laser imagers.

22. An imaging system comprising:
  a plurality of medical laser imagers, each of said laser imagers forming a medical diagnostic image on radiation-sensitive imaging media;
  polling means, located remotely from each of said laser imagers, for periodically polling each of said laser imagers to acquire data from the respective one of said laser imagers, said data being representative of at least one performance condition associated with the respective one of said laser imagers, wherein said data is representative of an optical density associated with said image;
  memory means, located remotely from said laser imagers, for storing said data acquired by said polling means from each of said laser imagers over a plurality of polling periods; and
  reporting means, located remotely from said laser imagers, for generating a report representative of the data stored by said memory means for each of said laser imagers over said plurality of polling periods.

23. The imaging system of claim 22, wherein said data representative of said at least one performance condition is further representative of an exposure level applied by said laser imager to said imaging media for formation of said images, said reporting means calculating, based on said data, parameters representative of a minimum optical density associated with said image, an optical density contrast associated with said image, and a development response of said imaging media, said report including an image quality report representative of said parameters for a plurality of images formed on said imaging media by said laser imager.

20

24. The imaging system of claim 23, wherein said means for generating said report includes means for generating said report in conformance with standards of an organization regulating usage of said laser imagers.

25. The imaging system of claim 22, further comprising means for sending said report to a user of each of said laser imagers via at least one of facsimile transmission, electronic mail, and a display associated with the respective one of said laser imagers.

26. The imaging system of claim 22, wherein said data representative of said at least one performance condition is further representative of an amount of usage of said imaging media, said system further comprising:
  means for accumulating a media usage value for each of said laser imagers based on the amount of usage of said imaging media by the respective one of said laser imagers over a plurality of said polling periods;
  means for comparing said media usage value to a media usage threshold; and
  means, responsive in the event said media usage value exceeds said media usage threshold, for initiating an order to send an additional amount of said imaging media to a user of the respective one of said laser imagers.

27. The imaging system of claim 22, wherein each of said laser imagers forms said image on said imaging media in response to image data generated by a plurality of different imaging modalities, and said data representative of said at least one performance condition is representative of an amount of usage of the respective one of said laser imagers by each of said different imaging modalities.

28. The imaging system of claim 27, further comprising means for allocating a monetary charge to each of said different imaging modalities, said monetary charge being proportional to the amount of usage of the respective one of said laser imagers by the respective one of said different imaging modalities.

29. A method for monitoring performance of at least one laser imager, the method comprising the steps of:
  periodically polling said laser imager to acquire data from said laser imager, said data being representative of at least one performance condition associated with said laser imager, wherein said data representative of said at least one performance condition includes data representative of an optical density associated with each of said images;
  storing said data acquired in said polling step over a plurality of polling periods; and
  generating a report representative of the stored data over said plurality of polling periods.

30. The method of claim 29, wherein said data representative of said at least one performance condition is further representative of an exposure level applied by said laser imager to said imaging media for formation of said image, said step of generating said report including calculating, based on said data, parameters representative of a minimum optical density associated with said image, an optical density contrast associated with said image, and a development response of said imaging media, said report including an image quality report representative of said parameters for a plurality of images formed on said imaging media by said laser imager.

31. The method of claim 30, wherein said step of generating said report includes generating said report in conformance with standards of an organization regulating usage of said laser imager.

32. The method of claim 29, further comprising the step of sending said report to a user of said laser imager via at least one of facsimile transmission, electronic mail, and a display associated with said laser imager.

33. The method of claim 29, wherein said data representative of said at least one performance condition is further representative of an amount of usage of said imaging media, said method further comprising the steps of:
   accumulating a media usage value based on the amount of usage of said imaging media over a plurality of said polling periods;
   comparing said media usage value to a media usage threshold; and
   initiating, in the event said media usage value exceeds said media usage threshold, an order to send an additional amount of said imaging media to a user of said laser imager.

34. The method of claim 29, wherein said laser imager forms an image on said imaging media in response to image data generated by a plurality of different imaging modalities, and said data representative of said at least one performance condition is further representative of an amount of usage of said laser imager by each of said different imaging modalities.

35. The method of claim 34, further comprising the step of allocating a monetary charge to each of said different imaging modalities, said monetary charge being proportional to the amount of usage of said laser imager by the respective one of said different imaging modalities.

36. The method of claim 29, wherein said step of periodically polling said laser imager includes periodically polling said laser imager remotely.

37. A method for remotely monitoring performance of each of a plurality of medical laser imagers, each of said laser imagers forming medical diagnostic images on radiation-sensitive imaging media, the method comprising the steps of:
   periodically polling each of said laser imagers remotely to acquire data from the respective one of said laser imagers, said data being representative of at least one performance condition associated with the respective one of said laser imagers, wherein said data is representative of an optical density associated with each of said images;
   storing said data acquired in said polling step from each of said laser imagers over a plurality of polling periods;
   generating a report representative of the stored data for each of said laser imagers over said plurality of polling periods.

38. The method of claim 37, wherein said data representative of said at least one performance condition is further representative of an exposure level applied by the respective one of said laser imagers to said imaging media for formation of said image, said step of generating said report including calculating, based on said data, parameters representative of a minimum optical density associated with said image, an optical density contrast associated with said image, and a development response of said imaging media, said report including an image quality report representative of said parameters for a plurality of images formed on said imaging media by the respective one of said laser imagers.

39. The method of claim 38, wherein said step of generating said report includes generating said report in conformance with standards of an organization regulating usage of said laser imagers.

40. The method of claim 37, further comprising the step of sending said report to a user of each of said laser imagers via at least one of facsimile transmission, electronic mail, and a display associated with the respective one of said laser imagers.

41. The method of claim 37, wherein each of said laser imagers forms an image on said imaging media in response to image data generated by a plurality of different imaging modalities, and said data representative of said at least one performance condition is further representative of an amount of usage of the respective one of said laser imagers by each of said different imaging modalities.

42. The method of claim 41, further comprising the step of allocating a monetary charge to each of said different imaging modalities, said monetary charge being proportional to the amount of usage of the respective one of said laser imagers by the respective one of said different imaging modalities.

43. The method of claim 37, wherein said data representative of said at least one performance condition is further representative of an amount of usage of said imaging media, said method further comprising the steps of:
   accumulating a media usage value for each of said laser imagers based on the amount of usage of said imaging media by the respective one of said laser imagers over a plurality of said polling periods;
   comparing said media usage value to a media usage threshold; and
   initiating, in the event said media usage value exceeds said media usage threshold, an order to send an additional amount of said imaging media to a user of the respective one of said laser imagers.

44. A method for remotely monitoring performance of each of a plurality of medical laser imagers, wherein each of said laser imagers forms a medical diagnostic image on radiation-sensitive imaging media based on image data received from a plurality of different imaging modalities, the method comprising the steps of:
   periodically polling each of said laser imagers remotely to acquire data from the respective one of said laser imagers, said data being representative of an optical density associated with said image, an exposure level applied by said laser imager to said imaging media, and an amount of usage of the respective one of said laser imagers by each of said different imaging modalities;
   storing said data acquired in said polling step from each of said laser imagers over a plurality of polling periods; and
   generating, based on said stored data, an image quality control report for each of said laser imagers and a modality usage report for each of said laser imagers,
   said step of generating said image quality control report including calculating, based on said data representative of said optical density and said exposure level, parameters representative of a minimum optical density associated with said image, an optical density contrast associated with said image, and a development response of said imaging media, said image quality control report being representative of said parameters for a plurality of images formed on said imaging media by said laser imager, and
   wherein said modality usage report represents, over said plurality of polling periods, said amount of usage of the respective one of said laser imagers by each of said different imaging modalities.

45. The method of claim 44, wherein said step of generating said image quality control report includes generating said image quality control report in conformance with standards of an organization regulating usage of said laser imagers.

23

46. The method of claim 44, further comprising the step of sending said image quality control report and said modality usage report to a user of each of said laser imagers via at least one of facsimile transmission, electronic mail, and a display associated with the respective one of said laser imagers.

47. The method of claim 44, wherein said data representative of said at least one performance condition is further representative of an amount of usage of said imaging media, said method further comprising the steps of:

accumulating a media usage value for each of said laser imagers based on the amount of usage of said imaging media by the respective one of said laser imagers over a plurality of said polling periods;

comparing said media usage value to a media usage threshold; and initiating, in the event said media usage value exceeds said media usage threshold, an order to send an additional amount of said imaging media to a user of the respective one of said laser imagers.

48. The method of claim 44, wherein said data representative of said at least one performance condition is farther representative of an error condition in the respective one of said laser imagers, wherein said step of generating said image quality control report and said modality usage report includes generating an error report for each of said laser imagers, said error report representing said parameter representative of said error condition over said plurality of polling periods.

49. The method of claim 48, further comprising the step, responsive to said parameter representative of said error condition, of initiating a request for dispatch of a service technician to the respective one of said laser imagers.

50. A system for monitoring performance of at least one medical laser imager, the laser imager forming medical diagnostic images on imaging media, the system comprising:

a polling device for periodically polling the laser imager to acquire data from the laser imager representative of an optical density associated with one or more images formed on the imaging media;

a memory for storing the data acquired by the polling device over a plurality of polling periods; and a reporting device for generating a report representative of the data stored by the memory over the plurality of polling periods.

51. The system of claim 50, wherein the data is further representative of an exposure level applied by the laser imager to the imaging media for formation of a plurality of the images, the reporting device calculating, based on the data, parameters representative of a minimum optical density associated with one of the images, an optical density contrast associated with one of the images, and a development response of the imaging media, the report including an image quality report representative of the parameters for the plurality of images formed on the imaging media by the laser imager.

52. The system of claim 50, wherein the data is further representative of an amount of usage of the imaging media, the system further comprising:

means for accumulating a media usage value based on the amount of usage of the imaging media over a plurality of the polling periods;

means for comparing the media usage value to a media usage threshold; and means, responsive in the event the media usage value exceeds the media usage threshold, for initiating an order to send an additional amount of the imaging media to a user of the laser imager.

53. The system of claim 50, wherein the laser imager forms the images on the imaging media in response to image data generated by a plurality of different imaging modalities, and the data is further representative of an amount of usage of the laser imager by each of the different imaging modalities, the report including a modality usage report representative of the amount of usage of the respective one of the laser imagers by each of the different imaging modalities.

54. A system for monitoring performance of at least one medical laser imager, the system comprising:

a device for remotely acquiring data from the medical laser imager representative of an optical density associated with one or more medical diagnostic images formed on imaging media;

a device for generating a report representative of the acquired data.

55. The system of claim 54, wherein the data is further representative of an exposure level applied by the medical laser imager to the imaging media for formation of a plurality of the medical diagnostic images, wherein the device for generating the report calculates, based on the data, parameters representative of a minimum optical density associated with the image, an optical density contrast associated with the image, and a development response of the imaging media, the report including an image quality report representative of the parameters for the plurality of medical diagnostic images formed on the imaging media by the laser imager.

56. The system of claim 54, wherein the data is further representative of an amount of usage of the imaging media, the system further comprising:

means for accumulating a media usage value based on the amount of usage of the imaging media over a period of time;

means for comparing the media usage value to a media usage threshold; and means, responsive in the event the media usage value exceeds the media usage threshold, for initiating an order to send an additional amount of the imaging media to a user of the laser imager.

57. The system of claim 54, wherein the laser imager forms the one or more medical diagnostic images on the imaging media in response to image data generated by a plurality of different imaging modalities, and the data is further representative of an amount of usage of the laser imager by each of the different imaging modalities, the report including a modality usage report representative of the amount of usage of the respective one of the laser imagers by each of the different imaging modalities.

58. A system for monitoring performance of at least one medical laser imager, the system comprising:

a device for remotely acquiring data from the medical laser imager, the data being representative of an optical density associated with one or more medical diagnostic images formed on imaging media, and the data being representative of an exposure level applied by the medical laser imager to the imaging media for formation of the one or more medical diagnostic images;

a device for calculating, based on the data, parameters representative of a minimum optical density associated with each of the images, an optical density contrast associated with each of the images, and a development response of the imaging media; and a device for generating a report including an image quality report representative of the calculated parameters for the plurality of images formed on the imaging media by the laser imager.

59. A system for monitoring performance of a medical imager, the imager forming medical diagnostic images on imaging media, the system comprising:

polling means for periodically polling said medical imager to acquire data from said medical imager, said data being representative of at least one performance condition associated with said medical imager, wherein said data representative of said at least one performance condition includes data representative of an optical density associated with each of said images on said imaging media;

memory means for storing said data acquired by said polling means over a plurality of polling periods; and reporting means for generating a report representative of the data stored by said memory means over said plurality of polling periods.

60. The system of claim 59, wherein said reporting means calculates, based on said data, parameters representative of a minimum optical density associated with said image, an optical density contrast associated with said image, and a development response of said imaging media, said report including an image quality report representative of said parameters for a plurality of images formed on said imaging media by said medical imager.

61. The system of claim 60, wherein said reporting means includes means for generating said report in conformance with standards of an organization regulating usage of said medical imager.

62. The system of claim 59, further comprising means for sending said report to a user of said medical imager via at least one of facsimile transmission, electronic mail, and a display associated with said medical imager.

63. The system of claim 59, wherein said data representative of said at least one performance condition includes data representative of an amount of usage of said imaging media, said system further comprising:

means for accumulating a media usage value based on the amount of usage of said imaging media over a plurality of said polling periods;

means for comparing said media usage value to a media usage threshold; and means, responsive in the event said media usage value exceeds said media usage threshold, for initiating an order to send an additional amount of said imaging media to a user of said medical imager.

64. The system of claim 59, wherein said medical imager forms said images on said imaging media in response to image data generated by a plurality of different imaging modalities, and said data representative of said at least one performance condition further includes data representative of an amount of usage of said medical imager by each of said different imaging modalities, said report including a modality usage report representative of said amount of usage of said medical imager by each of said different imaging modalities.

65. The system of claim 64, further comprising means for allocating a monetary charge to each of said different imaging modalities, said monetary charge being proportional to the amount of usage of said medical imager by the respective one of said different imaging modalities.

66. The system of claim 59, wherein said medical imager is located remotely from said system.

67. A method for monitoring performance of at least one medical imager, the imager forming medical diagnostic images on imaging media, the method comprising the steps of:

periodically polling said medical imager to acquire data from said medical imager, said data being representative of at least one performance condition associated with said medical imager, wherein said data representative of said at least one performance condition includes data representative of an optical density associated with each of said images;

storing said data acquired in said polling step over a plurality of polling periods; and generating a report representative of the stored data over said plurality of polling periods.

68. The method of claim 67, wherein said step of generating said report including calculating, based on said data, parameters representative of a minimum optical density associated with said image, an optical density contrast associated with said image, and a development response of said imaging media, said report including an image quality report representative of said parameters for a plurality of images formed on said imaging media by said medical imager.

69. The method of claim 67, wherein said step of generating said report includes generating said report in conformance with standards of an organization regulating usage of said medical imager.

70. The method of claim 67, further comprising the step of sending said report to a user of said medical imager via at least one of facsimile transmission, electronic mail, and a display associated with said medical imager.

71. The method of claim 67, wherein said data representative of said at least one performance condition is further representative of an amount of usage of said imaging media, said method further comprising the steps of:

accumulating a media usage value based on the amount of usage of said imaging media over a plurality of said polling periods;

comparing said media usage value to a media usage threshold; and initiating, in the event said media usage value exceeds said media usage threshold, an order to send an additional amount of said imaging media to a user of said medical imager.

72. The method of claim 67, wherein said medical imager forms an image on said imaging media in response to image data generated by a plurality of different imaging modalities, and said data representative of said at least one performance condition is further representative of an amount of usage of said medical imager by each of said different imaging modalities.

73. The method of claim 72, further comprising the step of allocating a monetary charge to each of said different imaging modalities, said monetary charge being proportional to the amount of usage of said medical imager by the respective one of said different imaging modalities.

74. The method of claim 67, wherein said step of periodically polling said medical imager includes periodically polling said medical imager remotely.

\* \* \* \* \*